United States Patent [19]

Michels

[11] 4,445,328

[45] May 1, 1984

[54] VARIABLE FILL FLUID COUPLING WITH CHARGING LIQUID COLLECTOR

[75] Inventor: Geoffrey H. Michels, Indianapolis, Ind.

[73] Assignee: Indian Head Incorporated, New York, N.Y.

[21] Appl. No.: 228,315

[22] Filed: Jan. 26, 1981

[51] Int. Cl.³ .............................................. F16D 33/06
[52] U.S. Cl. ...................................... 60/351; 60/357; 60/358
[58] Field of Search ................. 60/330, 351, 357, 358; 464/24

[56] References Cited

U.S. PATENT DOCUMENTS

| | | | |
|---|---|---|---|
| 1,938,357 | 12/1933 | Sinclair | 60/358 |
| 2,334,282 | 11/1943 | Peterson et al. | 60/357 |
| 2,627,166 | 2/1953 | Becker | 60/351 |
| 2,644,304 | 7/1953 | Becker | 60/358 |
| 2,664,705 | 1/1954 | Becker | 60/357 |
| 3,210,940 | 10/1965 | Bunnelle | 60/358 |
| 3,237,408 | 3/1966 | Bunnelle | 60/358 |
| 3,862,541 | 1/1975 | Bunnelle | 60/360 |

FOREIGN PATENT DOCUMENTS

| | | |
|---|---|---|
| 392629 | 5/1933 | United Kingdom . |
| 799234 | 8/1953 | United Kingdom . |
| 765668 | 1/1957 | United Kingdom . |
| 1455319 | 11/1976 | United Kingdom . |
| 1499473 | 2/1978 | United Kingdom . |

*Primary Examiner*—A. Michael Chambers
*Attorney, Agent, or Firm*—Lyon & Lyon

[57] ABSTRACT

In variable fill-type fluid couplings, a driving impeller and a driven runner are coupled for joint rotation by means of a liquid medium in an active liquid chamber formed by the rotating members. The active liquid chamber is continuously bled at a selected constant rate and continuously fed at a rate that can be changed to control the volume of fill of the liquid therein. Charging liquid is fed from a source to enter a mouth of the active liquid chamber. To insure that all of the charging liquid enters the active liquid chamber, the mouth is provided with a charging liquid collector that forces charging liquid past the mouth and into the active liquid chamber. The liquid collector can comprise an outer ring, an inner ring, and a plurality of pitched blades between the two rings. The collector rotates with the driving impeller, thereby forcing charging liquid past the mouth and into the active liquid chamber.

10 Claims, 4 Drawing Figures

VARIABLE FILL FLUID COUPLING WITH CHARGING LIQUID COLLECTOR

BACKGROUND

This invention relates to a variable fill fluid coupling, and more specifically, it pertains to an improvement in the means for achieving filling of such a coupling with charging liquid.

Variable fill-type fluid couplings are used for coupling a variable-speed driver to a constant-speed output, or more commonly, to couple a constant-speed driver to an output device that requires a variable speed. For example, such couplings are particularly useful for driving centrifugal pumps that serve as booster pumps for water systems serving apartment houses and other buildings, wherein constant system pressures under varying flow conditions are desirable. Other applications can be found in municipal water systems and in commercial industrial processes.

Such variable-speed couplings are described in U.S. Pat. Nos. 3,210,940, 3,237,408, and 3,862,541 which are incorporated herein by this reference. Fluid couplings can be of the dual or double runner and impeller type, such as described in U.S. Pat. No. 3,210,940, or of the single runner and impeller type such as described in U.S. Pat. No. 3,862,541.

In both types of fluid couplings, liquid constantly bleeds from an active liquid working chamber in the coupling and charging liquid is constantly added thereto. A driving impeller and a driven runner are rotatably mounted in the working chamber and are coupled for joint rotation by the active liquid. The rate of bleeding of liquid from the active liquid chamber is established at a constant rate, while the rate of adding liquid thereto can be varied to change and to stabilize the volume of liquid in the chamber to provide a predetermined speed for the driven element of the coupling, under a given load.

In the aforementioned U.S. Pat. No. 3,210,940, a variable fill fluid coupling is disclosed where the active liquid working chamber of the coupling is charged by a positive displacement pump which is driven at a constant speed from the impeller shaft. The pump supplies the charging liquid from a sump at the bottom of the housing that encompasses the coupling. The active liquid chamber has a mouth for receiving charging liquid. The charging mouth is aligned with the longitudinal axis of the coupling, which is horizontally oriented. A charging chute directs the stream of charging liquid into the mouth. A charging stream splitter assembly is provided to determine the proportion of the charging liquid which enters the working chamber of the coupling with the balance of the charging liquid being bypassed and returned to the sump. The more charging liquid introduced into the working chamber, the faster the driven runner rotates.

U.S. Pat. No. 3,862,541 shows a modification of the coupling shown in U.S. Pat. No. 3,210,940. The modification includes the use of a nozzle for directing charging liquid to the mouth of the fluid coupling. An advantage of the use of the nozzle is a faster response between a change in the control setting of the fluid coupling and the resultant change of speed of the driven runner.

In at least two instances, there is difficulty in insuring that all of the charging liquid directed at the mouth of the fluid coupling actually enters the active liquid chamber. One such problem exists when the mouth faces downwardly so that charging liquid needs to be forced upwardly into the mouth. Due to the force of gravity acting on the charging liquid, a portion of the charging liquid that is supposed to pass through the mouth into the working chamber actually flows downwardly into the liquid sump.

Another problem can occur with large fluid couplings. For large fluid couplings, a support member is placed within the mouth to provide structural support. The support member, although it has openings for charging liquid, restricts flow of charging liquid through the mouth. At high rates of flow of the charging fluid, a condition that is required when rapid increases and high output speeds are required, charging liquid can splash back off the support member and into the sump. This problem is of course compounded when a large fluid coupling having a support member in the mouth is oriented so that the charging liquid is introduced upwardly into the mouth against the force of gravity.

The result of these problems is that the liquid volume in the working liquid chamber cannot be increased rapidly in response to external signals to the control mechanism which may require timely and rapid output speed increases. This results in the device connected to the output shaft of the fluid coupling rotating at a speed lower than desired for a longer period of time than acceptable, with an unacceptable resultant loss in magnitude of the output speed.

In view of these problems, it is apparent that there is need for a variable fill fluid coupling which, even when the mouth is facing downwardly and/or the mouth has an obstruction, is able to take in large amounts of charging liquid rapidly when required to do so.

SUMMARY

The present invention is directed to a variable fill-type fluid coupling which has these features. The coupling includes a driving impeller and a driven runner rotatably mounted in liquid coupling relationship. An active liquid chamber defined between the impeller and runner has a mouth for receiving charging liquid and at least one discharge passage allowing the liquid to be bled. Charging liquid is introduced into the active liquid chamber as a flowing stream through the mouth of the liquid chamber. To insure that all of the flowing stream of charging liquid enters the active chamber, a liquid collector is mounted in the mouth for forcing or drawing the flowing stream of liquid into the active liquid chamber. The collector is mounted to rotate with the driving impeller. Preferably the liquid collector comprises a plurality of blades or vanes so that the liquid collector acts to intercept and move the charging liquid past the mouth and any restrictions which may be located therein and into the active liquid chamber.

With the liquid collector of the present invention, substantially all of the charging liquid enters the active liquid chamber, even when the mouth faces downwardly and/or there is an obstruction in the mouth. Thus, the liquid coupling is able to operate at maximum efficiency with assurance that the output speed changes from the coupling are kept rapid and responsive.

DRAWINGS

These and other features, aspects, and advantages of the present invention will become better understood with reference to the following description, appended claims, and accompanying drawings, where:

DESCRIPTION

Figure 1:
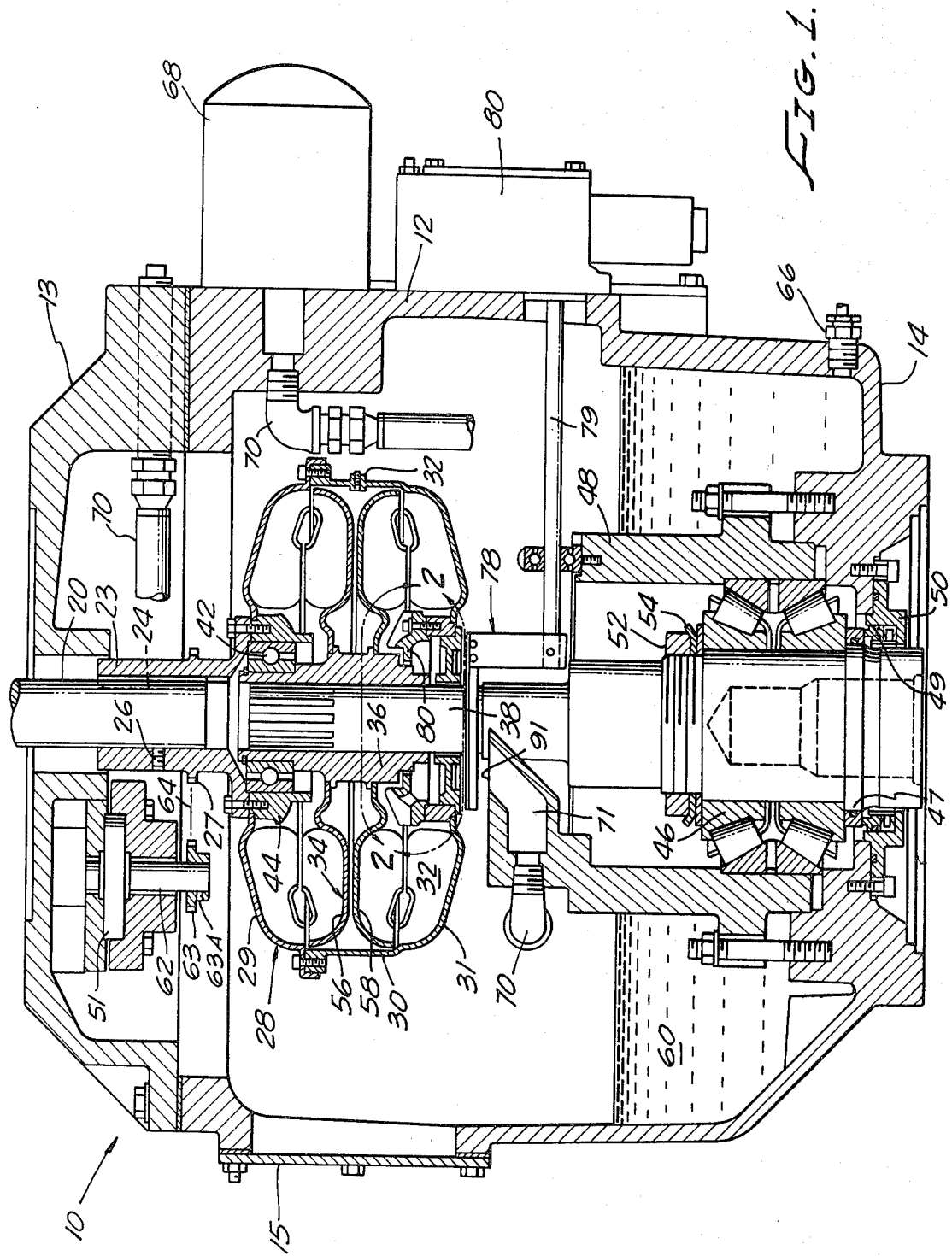
FIG. 1 is a longitudinal sectional view of a coupling according to the present invention.

With reference to FIG. 1, a variable-fill liquid coupling 10 is provided with a main housing 12 to which a drive motor mounting plate 13 is bolted forming one end of the housing. The housing 12 includes an integral pump mounting plate 14 which forms the opposite end of the housing. A cover plate 15 is secured to the side of the housing. The coupling 10, except for the liquid collector described below, is substantially the same as that sold by Peerless Pump of Indianapolis, Ind., under the designation Vertical Hydroconstant, models VS, VH, and VC.

The coupling includes an input shaft 20, and a hub 23 mounted on the end of the input shaft 20 within the main body of the housing 12. A key 24 locks the hub into position for rotation with the shaft 20. Set screws 26 are provided to lock the hub on the shaft. Circumferentially arranged on the central portion of the hub 23 is a sprocket 27 for providing a driving connection with a circulating pump 51 for the charging liquid. A drive shaft of a motor (not shown) is arranged to be concurrent with, or so secured to the end of the input shaft 20 for causing rotation of the input shaft 20.

In the form of the invention being described and shown in FIG. 1, the fluid coupling is of the dual or double runner and impeller type. However, the present invention is usable with fluid couplings of the single runner and impeller type.

A driving impeller 28 is bolted to the hub 23 and thus is adapted to be continuously driven as the input shaft 20 rotates. The driving impeller 28 has a first driving section 29 to which is bolted a peripheral shroud 30, and the shroud 30 mounts a second driving section 31. A working chamber 32 is surrounded by the shroud. Means are provided to constantly bleed liquid from the working chamber 32 in the form of a plurality of removable orifice screws 33. The screws can be provided with metered bores to facilitate selection of the desired bleeding rate of liquid from the working chamber 32 of the coupling.

Also mounted within the working chamber 32 of the coupling is a runner 34 which is supported by an output hub 36 mounted on an output shaft 38 of the coupling by means of a spline connection. The output of drive shaft 38 is rotatably mounted by bearings 42 held against the output hub 36 by a bearing cap 44 bolted to the input hub 23. The other end of the output shaft 38 is rotatably supported by thrust bearings 46 held in place by a bearing cap 48 bolted to the main housing 12. The thrust bearings 46 are held against a shoulder 47 on the shaft 38 by a bearing lock nut 52 and a lock washer 54 with the lock nut 52 being threaded onto the shaft 38. A shaft seal assembly 49 is secured within the lower portion of the main housing 12 by a flange plate 50 bolted to the main housing 12.

The double runner 34 is formed with two sections. There is a first driven section 56 and a second driven section 58, both of which are mounted on the output hub 36.

As is conventional, both the driving impeller 28 and the driven runner 34 are provided with operating blades. Rotation of the input shaft 20 causes rotation of the input hub 23 and the driving impeller 28. Due to cooperation between the blades (not shown) of the driving impeller 28 and the blades (not shown) of the driven runner 34, the driven runner 34 rotates, thereby causing the output shaft 38 to rotate. The relative speed of rotation of the output shaft 38 versus the speed of rotation of the input shaft 20 depends upon the quantity of fluid fill of the working chamber 32.

The liquid coupling in FIG. 1 has the output shaft and the input shaft vertically oriented. However, the present invention can be used with fluid couplings where the output shaft and input shaft are horizontally oriented, or oriented skewed to the horizontal.

The circulating pump 51 transfers the charging liquid from a sump 60 at the bottom of the housing 12 to the active liquid chamber 32. The pump 51 is bolted to the underside of the drive motor mounting plate 13. A drive shaft 62 extends outward from the pump body and has a sprocket 63 secured by a set screw 63A. A drive chain 64 is trained about the sprocket 63 and the sprocket 27 mounted on the input hub 23 to drive the pump from the input hub 23.

The inlet of the circulating pump 51 receives charging liquid from the sump 60 at the bottom of the main housing 12. The charging liquid is pumped by the pump 51 to a heat exchanger (not shown) located outside the main housing 12 to cool the liquid. The cooled charging liquid is returned to an oil filter 68 mounted on the outside of the housing 12. Filtered oil passes from the filter 68 via line 70 to be introduced by a nozzle 71 as a liquid stream oriented to enter the mouth of the active liquid chamber 32.

Figure 2:
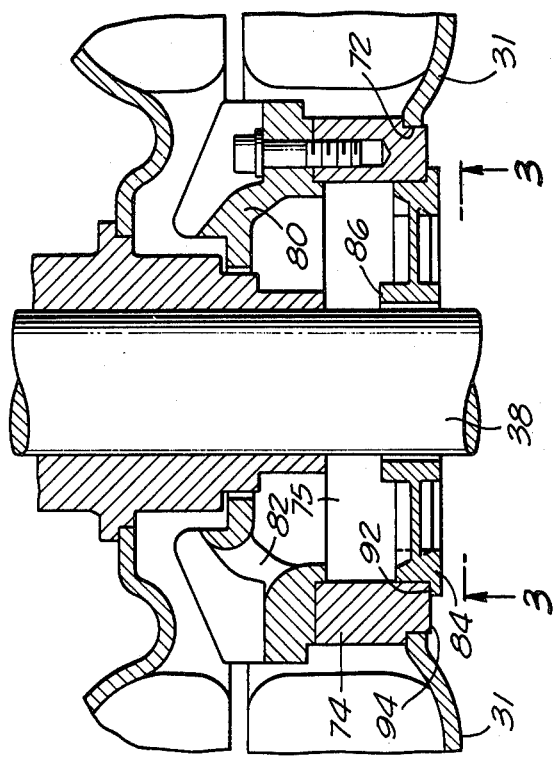
FIG. 2 is an enlarged sectional view of the area 2 of FIG. 1.
Figure 4:
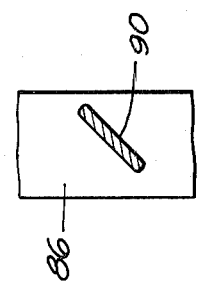
FIG. 4 is a sectional view of one of the blades of the liquid collector of FIG. 3 taken on line 4—4 of FIG. 3.

With reference to FIGS. 1 and 2, the second driving section 31 is provided with an inner annular edge 72 which is radially spaced from the output shaft 38. Mounted and supported by this inner annular edge 72 is an annular mouthpiece 74 that is spaced apart from the shaft 38. The annular opening between the mouthpiece 74 and the output shaft 38 is in a plane perpendicular to the axis of rotation of the output shaft and serves as a mouth 75 for the active liquid chamber 32. As described in U.S. Pat. No. 3,862,541, the nozzle 71 has an outlet 91 located adjacent the mouth. The outlet is aligned to direct a flowing stream of charging liquid into the mouth.

Because the circulating pump 51 is driven by the input shaft 20 which is driven by a constant-speed drive motor (not shown), the stream of liquid flowing into the mouthpiece has a constant quantity of flow. In order to vary the output of the coupling, it is necessary to vary the quantity of liquid in the active liquid chamber 32 to regulate the speed at which the driven runner 34 is driven. Since the metered bores of the orifice screws 33 have a fixed size during operation, the quantity of liquid in the active liquid chamber cannot be varied substantially by modification of the liquid flow discharge from the chamber. Therefore, it is necessary to control the quantity of liquid entering the mouth 75 to regulate the liquid fill of the active liquid chamber.

For this purpose, a splitter assembly 78 is positioned by a control shaft 79 and a control system 80A mounted on the side of the exterior of the main housing 12. Reference is made to the aforementioned U.S. Pat. No.

3,862,541 for the details of the construction and operation of such a splitter assembly, control shaft, and control system.

A support member 80 is bolted to the mouthpiece 74 and is located between the mouthpiece and the output hub 36, thereby restricting flow through the mouth into the active liquid chamber. The support member 80 provides structural support to the mouthpiece 74. The support member 80 has a plurality of openings 82 which provide communication between the mouth 75 and the active liquid chamber for charging liquid. However, due to the restriction caused by the support 80, and the fact that charging liquid is directed upwardly into the active liquid chamber in the embodiment of the invention shown in the figures, a portion of the charging liquid is not always passed into the active liquid chamber 32.

To overcome this problem, a charging liquid collector 84 is provided. The charging liquid collector 84 is mounted in the mouth 75 for intercepting and forcing the charging liquid into the active liquid chamber.

Figure 3:
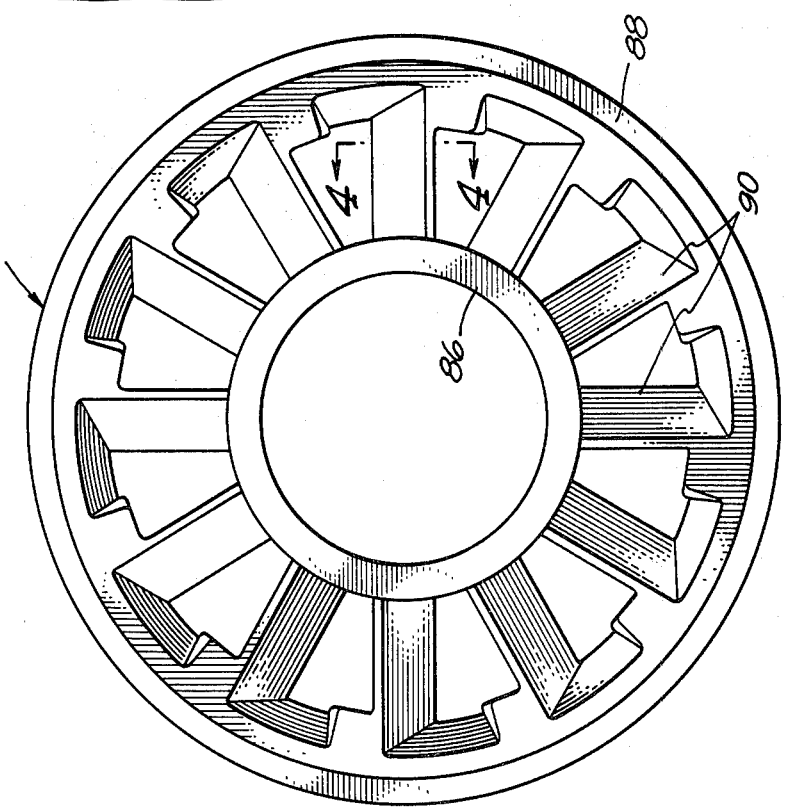
FIG. 3 is a front elevation view of the liquid collector of FIG. 1 taken on line 3—3 of FIG. 2.

With reference to FIGS. 2 and 3, the liquid collector 84 comprises an inner ring or hub 86, an outer ring or rim 88, with a plurality of pitched blades or vanes 90 therebetween extending radially outwardly from the hub 86 to the rim 88. In the version of the invention shown in FIG. 3, there are sixteen vanes 90 equally spaced from each other.

The rim 88 is of sufficiently large diameter that it can be press fitted into the mouthpiece 74, as shown in FIG. 2. The inner diameter of the hub 86 is sufficiently large that the liquid collector 84 slides over the output shaft 38 and is spaced apart therefrom. The liquid collector 84 rotates with the mouthpiece and driving impeller 28 at the speed of rotation of the input shaft 20. The outer rim 88 includes a radially extending flange 92 which butts up against the downward-facing surface 94 of the mouthpiece 74 to fix the position of the liquid collector 84 in the mouth 75.

The blades or vanes 90 are pitched a sufficient amount that charging liquid does not splash against the blades and out of the mouth. For this purpose, preferably the blades are pitched relative to the plane perpendicular to the axis of rotation of the liquid collector 84 from about 40 to about 50 degrees, and more preferably about 45 degrees. Due to the bladed construction of the collector 84, the charging liquid stream is intercepted and forced into the active liquid chamber, much as a pump impeller controls and moves liquid. Thus, even when the mouth of an active liquid chamber faces downwardly, and the mouth has a constriction therein, large quantities of charging liquid can be introduced into the active liquid chamber of a variable fill fluid coupling.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. In a variable fill-type liquid coupling having a housing, a driving impeller rotatably mounted in the housing, a driven runner rotatably mounted within the housing in liquid coupling relation with the impeller, an active liquid chamber between the runner and the impeller, a mouth for receiving charging liquid directed into the active liquid chamber, and means for directing charging liquid from a liquid source to produce a flowing stream of liquid to enter the mouth, the improvement comprising charging liquid collection means mounted in the mouth for forcing the flowing stream of liquid into the active liquid chamber, the charging liquid collection means being mounted to rotate with the driving impeller.

2. The coupling of claim 1 in which the mouth faces downwardly and is in a plane perpendicular to the axis of rotation of the liquid collection means.

3. The coupling of claim 1 or 2 in which the mouth includes a support member mounted therein, the support member restricting flow of charging liquid through the mouth.

4. A variable fill-type liquid coupling, comprising:
  (a) a housing;
  (b) a driving impeller rotatably mounted in the housing;
  (c) a driven runner rotatably mounted within the housing in liquid coupling relation with the impeller;
  (d) an active liquid chamber between the runner and the impeller;
  (e) a mouth for receiving charging liquid directed into the active liquid chamber;
  (f) a means for directing charging liquid from a liquid source to produce a flowing stream of liquid to enter the mouth;
  (g) a mouth obstruction which partially intercepts the flowing stream of liquid to enter the mouth; and
  (h) a charging liquid collection means mounted in the mouth for forcing the flowing stream of liquid past the mouth obstruction into the active liquid chamber, the charging liquid collection means being mounted to rotate with the driving impeller.

5. The coupling of claim 4 in which the mouth obstruction comprises a support member provided with a plurality of openings through which the flowing stream of liquid passes.

6. The coupling of claim 4 or 5 in which the mouth faces downwardly and is in a plane perpendicular to the axis of rotation of the liquid collection means.

7. In a variable fill-type liquid coupling having a housing, a driving impeller rotatably mounted in the housing, a driven runner rotatably mounted within the housing in liquid coupling relation with the impeller, an active liquid chamber between the runner and the impeller, a mouth for receiving charging liquid directed into the active liquid chamber, and means for directing charging liquid from a liquid source to produce a flowing stream of liquid to enter the mouth, the improvement comprising a charging liquid collection means mounted in the mouth for forcing the flowing stream of liquid into the active liquid chamber, the charging liquid collection means being mounted to rotate with the driving impeller, said charging liquid collection means comprising an outer ring and an inner ring, and a plurality of blades therebetween.

8. The coupling of claim 7 in which the outer ring is sized so that the liquid collection means is press fitted into the mouth.

9. The coupling of claim 8 in which the blades are pitched a sufficient amount that charging liquid is not splashed against the blades away from the active liquid chamber.

10. The coupling of claim 6 or 9 in which the blades are pitched an amount from about 40 to about 50 degrees relative to the plane perpendicular to the axis of rotation of the liquid collection means.

* * * * *